UNITED STATES PATENT OFFICE.

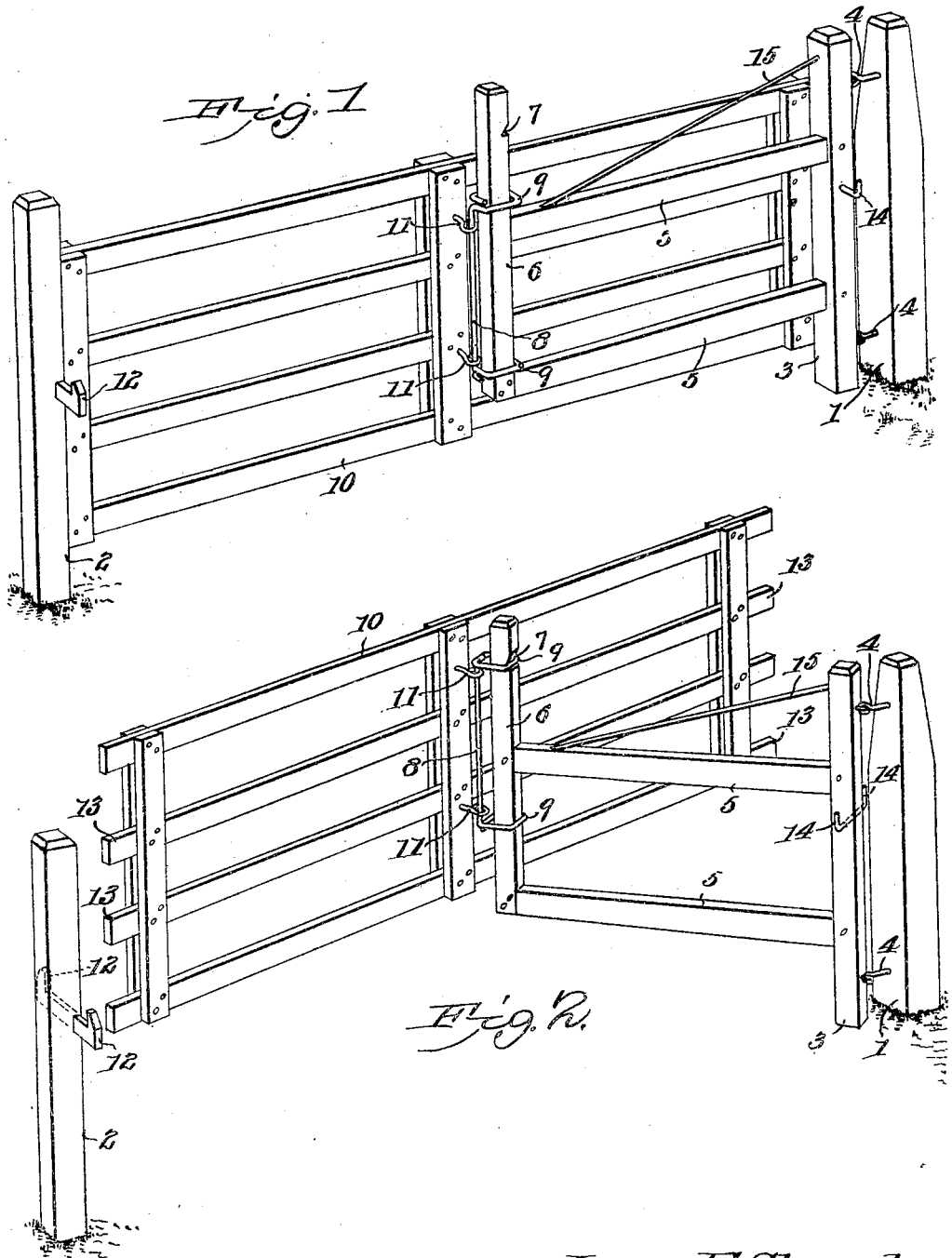

JAMES F. STROUD, OF EMERSON, IOWA, ASSIGNOR OF ONE-HALF TO SYLVESTER STROUD, OF MILLS COUNTY, IOWA.

GATE.

No. 814,746.      Specification of Letters Patent.      Patented March 13, 1906.

Application filed June 23, 1905. Serial No. 266,659.

*To all whom it may concern:*

Be it known that I, JAMES F. STROUD, a citizen of the United States, residing at Emerson, in the county of Mills and State of Iowa, have invented a new and useful Gate, of which the following is a specification.

My invention relates to gates, and has for its object to provide a gate embodying new and improved features of utility and convenience.

A further object of my invention is to provide a gate which may be opened in either direction and while held at different heights from the ground.

A further object of my invention is to provide a gate having an arm hinged to one post and extending to the center of the gate-opening and to the end of which the gate-panel is hinged at its vertical middle line.

It is well known that snow often fills a gateway to the extent of making it inconvenient or impossible to open the gate.

It is an object of my invention to provide a gate the panel of which may be raised above the snow and while in such raised position opened and closed in the same manner as when near the ground. The gate-panel may be similarly raised at other times to permit the passage of small stock when desired.

With these and other objects in view the present invention consists in the combination and arrangement of parts, as will be hereinafter more fully described, shown in the accompanying drawings, and particularly pointed out in the appended claims, it being understood that changes in the form, proportions, size, and minor details may be made within the scope of the claims without departing from the spirit or sacrificing any of the advantages of the invention.

In the accompanying drawings, Figure 1 is a perspective view of my improved gate shown in its closed and lowest positions. Fig. 2 is a perspective view of my improved gate shown partially open and raised to permit its passage over snow or the passage thereunder of small animals.

Like characters of reference designate corresponding parts in both the figures of the drawings.

In its preferred embodiment my improved gate comprises the usual gate-post 1, to which the gate is hinged, and the post 2, to which it is latched. Adjacent the post 1 is mounted a bar 3, pivoted at top and bottom in any approved manner, as by the hinges 4. To the pivot-bar 3 is secured one or more arms 5, extending outwardly into the gate-opening and substantially to the middle thereof and provided at their outer ends with an upright 6. The upright 6 is provided with a notch 7 and a slidable member 8, having loops 9 embracing and slidable upon the upright 6.

To close the gate-opening, a gate-panel 10 is provided hinged at its middle line to the member 8, as by the eyes 11. The post 2 is provided upon each side with a latch member 12, arranged to engage the extended ends 13 of the gate-panel, and the pivot-bar 3 is provided with latch members 14, likewise arranged to engage the ends 13. The arm 5 may be supported by any additional means, as the brace 15.

The operation of my improved gate is as follows: With the gate in its lower position, as shown in Fig. 1, the gate-opening is effectively closed against animals of any size. The gate may be raised vertically by moving the member 8 upward upon the upright 6 until the loop 9 engages within the notch 7, as shown in Fig. 2. In either position the gate may be opened by disengaging the ends 13 from the latch member 12 and swinging in either direction upon the hinges 4, or the gate may be swung at its center upon the eyes 11 and member 8, as indicated in Fig. 2, so that the ends 13, extending from either end of the gate-panel, may engage the latch 12 or the latch 14.

From the foregoing description of the operation of my improved gate it will be obvious that the gate may be opened and closed in a much smaller space than can be done with a gate of equal length hinged only at the end. It will also be seen that my improved gate is capable of a large number of adjustments, which adds to the convenience of its operation.

Having fully described the invention, what is claimed is—

1. A gate comprising, a post, an arm hinged to the post, an upright fixed to the free end of the arm, a rod vertically slidable upon the upright and a gate-panel centrally hinged upon the rod.

2. A gate comprising, a post, an arm hinged to the post, an upright fixed to the free end of the arm and provided with a notch adjacent the top, a rod embracing the upright and arranged to engage within the notch, and a gate-panel centrally hinged to the rod.

3. A gate comprising, a post, an arm hinged to the post and to swing in a horizontal plane in either direction, an upright fixed to the free end of the arm, a rod vertically slidable upon the upright and a gate-panel centrally hinged to and movable with the rod.

4. A gate comprising, a post, an arm hinged to the post, an upright fixed to the free end of the arm, a rod disposed adjacent to and parallel with and having a loop at each end slidably embracing the upright, and a gate-panel hinged to and slidable with the rod.

5. A gate comprising, a post, an arm hinged to the post, an upright fixed to the free end of the arm and provided with a notch, a rod disposed adjacent to and parallel with and having at each end a loop embracing the upright one of said loops arranged to engage within the notch, and a gate-panel centrally hinged to and slidable with the rod.

6. A gate comprising spaced posts, a vertical pivot-bar hinged to one post, an arm rigidly outstanding from the pivot-bar, an upright fixed upon the free end of the arm, a rod vertically slidable upon the upright, a gate-panel hinged to the rod, latch members secured to opposite sides of the pivot-bar, latch members mounted upon opposite sides of the post opposite the pivot-bar and means carried by each end of the gate for engaging either of said latch members.

7. A gate comprising, spaced posts, a vertical pivot-bar hinged to one post, an arm rigidly outstanding from the pivot-bar, an upright fixed upon the free end of the arm and provided adjacent its upper end with a notch, a rod disposed adjacent to and parallel with the upright and having at each end a loop loosely embracing the upright and capable of moving vertically thereon and the uppermost loop engaging within the notch, latch members mounted upon opposite sides of the pivot-bar, latch members mounted upon opposite sides of the post opposite the pivot-bar, a gate-panel centrally hinged upon the rod and movable therewith and means at each end of the gate for engaging either latch member and at either height.

8. A gate comprising gate-posts, an arm vertically hinged to one post and carrying a vertical upright at its end extending above the arm and provided with a rod vertically slidable upon the upright, and means for retaining the rod in a raised or a lowered position, a gate-panel hinged at its central line upon the slidable rod, latch members secured upon opposite sides of one post, and means carried by each end of the panel for engagement with the latch member upon either post.

In testimony that I claim the foregoing as my own I have hereto affixed my signature in the presence of two witnesses.

JAMES F. STROUD.

Witnesses:
  CHAS. O. HUTCHINGS,
  J. W. TRIPLETT.